United States Patent [19]

Dunn

[11] Patent Number: 4,759,149
[45] Date of Patent: Jul. 26, 1988

[54] PLASTIC CRUSTACEAN TRAP

[75] Inventor: David P. Dunn, Shoreview, Minn.

[73] Assignee: Pyramid Trap & Accessories, Inc., Sugar Loaf Shores, Fla.

[21] Appl. No.: 7,958

[22] Filed: Jan. 28, 1987

[51] Int. Cl.$^4$ ............................................. A01K 69/08
[52] U.S. Cl. ...................................................... 43/102
[58] Field of Search .................................. 43/100, 102

[56] References Cited

U.S. PATENT DOCUMENTS

| | | | |
|---|---|---|---|
| 3,708,905 | 1/1973 | Jalbert | 43/100 |
| 3,826,032 | 7/1974 | Torngren | 43/100 |
| 3,842,529 | 10/1974 | Richard | 43/100 |
| 3,906,655 | 9/1975 | Lowenthal, Jr. | 43/100 |
| 4,159,591 | 7/1979 | Plante | 43/100 |
| 4,221,070 | 9/1980 | Swindell | 43/100 |
| 4,486,973 | 12/1984 | Faucillon | 43/100 |
| 4,611,424 | 9/1986 | Tarantino | 43/100 |
| 4,648,199 | 3/1987 | Deaton | 43/100 |
| 4,648,200 | 3/1987 | Miller | 43/100 |

Primary Examiner—Gene P. Crosby
Attorney, Agent, or Firm—Kinney & Lange

[57] ABSTRACT

A plastic crab trap that is molded in one operation, including a cover member, and side walls that are adequately reinforced for rigidity, taper upwardly and have slots through which water can flow. The cover is molded in place in what will be the top opening, but reversed from its operating portion, and is connected in the opening through sprues which feed plastic from the input opening for plastic material after molding the cover. After molding, the cover is cut loose from the main part of the crab trap, and upon rotating the cover 180° provided hinge and latch members between the cover and the main body of the crab trap are properly positioned without further operations. Additionally, a specific bait box holder is provided adjacent to the cover so that when the cover is closed, the bait box will be held in place, and can be easily removed for service once the cover is opened.

14 Claims, 4 Drawing Sheets

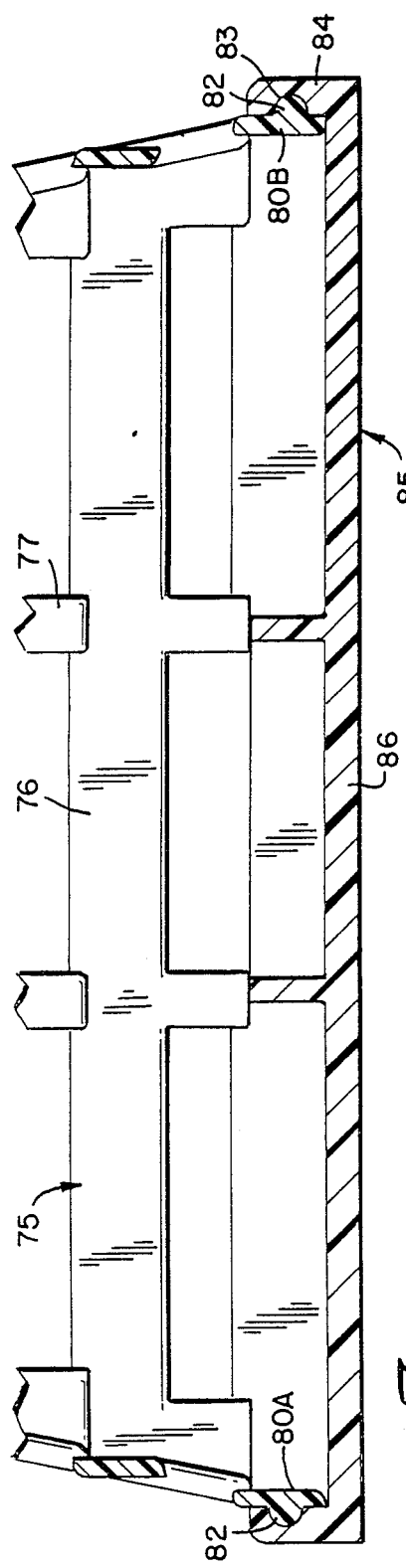
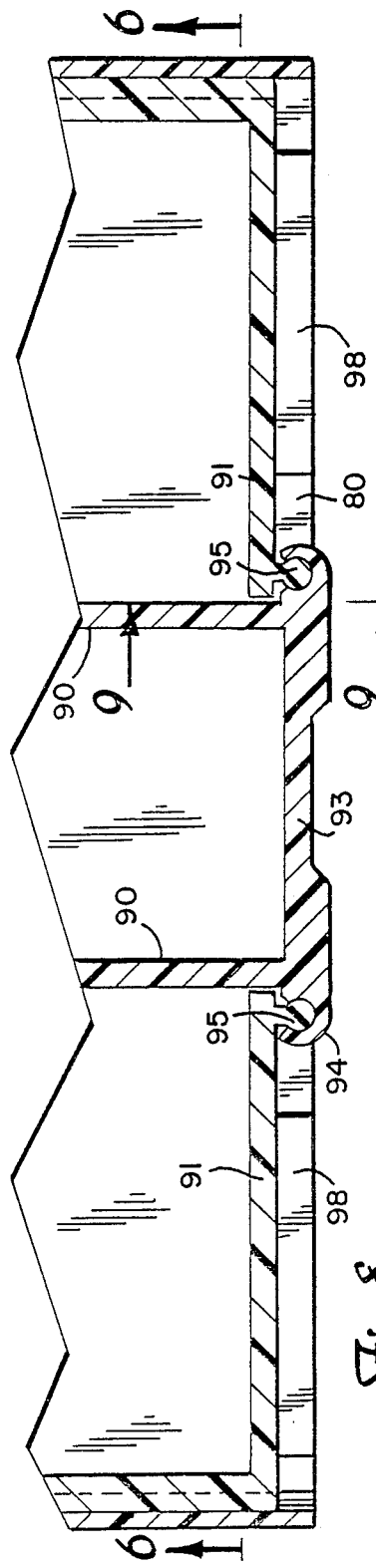
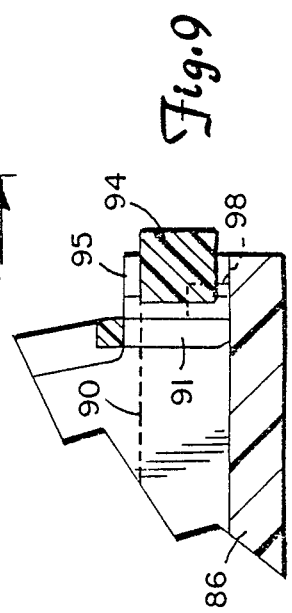

PLASTIC CRUSTACEAN TRAP

BACKGROUND OF THE INVENTION

1. Field of the Invention

The present invention relates to crustacean traps, and more particularly to a trap designed specifically for crabs or lobsters that is molded out of plastic, is made so that it adequately supports the necessary bait box, and has sufficient rigidity to withstand tidal action and other external forces, and which provides for manufacture in the trap in one molding operation.

2. Description of the Prior Art

Traps for crustaceans have been made out of synthetic materials, but generally are more complex to manufacture than the present device, and are less than satisfactory in operation. For example, U.S. Pat. No. 4,221,070, issued Sept. 9, 1980 to Swindell, shows a trap for fish and crustaceans that is formed of a plastic mesh and has a hexagon shape with the inlet trap portions at the ends. The parts of the unit snap together, but it cannot be made in a single molding operation as the present device, and does not have the general pyramidal shape design, molded in a unitary system with uprightly extending reinforcing channels.

It does have channel shaped reinforcements, but they are not formed between adjacent horizontal slats to provide slats that can be molded in one piece so that the unit can be pulled from a mold.

U.S. Pat. No. 3,906,655, issued Sept. 23, 1975 to Lowenthal, Jr., shows a plastic material trap and cage for aquatic animals, but it is made in multiple parts that have to be fastened together, and without any teaching of molding a cover and trap in one operation.

Another trap having plastic wall segments is shown in U.S. Pat. No. 3,826,032, issued July 30, 1974 to Torngren. This trap is made up of wall segments that have to be joined together, and does not show the arrangement of having a trap and the top cover for the trap which can be molded in place and then reassembled for providing a hinging cover that can be opened and closed. The wall segments of U.S. Pat. No. 3,826,032 are held together with separate fasteners.

U.S. Pat. No. 3,708,905, issued Jan. 9, 1973 to Jalbert, shows a plastic lobster trap that has plastic panels formed in individual segments that are joined together, and shows a hinging cover. The assembly includes a large number of separate fasteners that increase assembly time and cost.

U.S. Pat. No. 4,159,591, issued July 3, 1979 to Plante, shows a panel that is made out of plastic for use in a lobster trap, but which uses other components for the main part of the trap, and which requires assembly procedures substantially different from those of the present invention. A shellfish trap which utilizes a frame or cage that is made of molded plastic sections, and which has a plastic material for forming the bottom is shown in U.S. Pat. No. 4,486,973, issued Dec. 11, 1984 to Faucillon. The frame is covered with a mesh material, however, and the trap is not a one piece molded unit as is the present invention. This patent teaches that the mesh used on the trap can be made with plastic as well, but the mesh has to be separately made and separately fastened in place.

The need for a non-deteriorating, sturdy, and easily used, low cost trap for crustaceans such as crabs has continued. The present invention provides such a device.

SUMMARY OF THE INVENTION

The present invention relates to a plastic crustacean trap made substantially in a single-molding operation, except for the bait box, and which trap has pyramidal, slatted, side walls joined with vertically extending channel shaped reinforcements, and a top wall defining an access opening. The top wall is formed with this access opening defined by a perimeter and the cover for such opening is molded in place in the opening at the same time that the side walls are molded, according to the present invention. The cover is held in its position within the opening with the normal sprues or gates necessary for plastic molding, and after molding the sprues holding the cover in place can be cut, the cover removed and rotated 180° for use. In the molding operation interfitting hinge members and latches are made on the perimeter of the opening in the top wall and on the cover so that the cover can be snapped into place on hinge supports after being released and rotated 180°, and then hinged open and closed for access to the interior of the trap.

The bait box is separately molded, and is mounted in guide track members that are molded into the bottom side of the top wall of the trap in the initial molding operation. The bait box is accessible (and can be removed) through the top opening when the cover is open, and when the cover is closed a stop on the cover is positioned to hold the bait box locked in position.

The arrangement provides for a very easily made, and durable crustacean trap. The plastic material is not affected by the hostile environment of the sea, and the unit is also very easy to use because of the access through the top opening, and the easy access to the bait box.

BRIEF DESCRIPTION OF THE DRAWINGS

FIG. 7 is a fragmentary sectional view of a bottom portion of a modified form of the plastic trap of the present invention showing a bottom that can be slidably removed and installed as a bottom of the trap;

FIG. 8 is a fragmentary sectional view showing a latch arrangement for locking the cover in a closed position enclosing the bottom of the trap; and FIG. 9 is a sectional view taken on line 9—9 in FIG. 8.

DETAILED DESCRIPTION OF THE PREFERRED EMBODIMENTS

Figure 1:
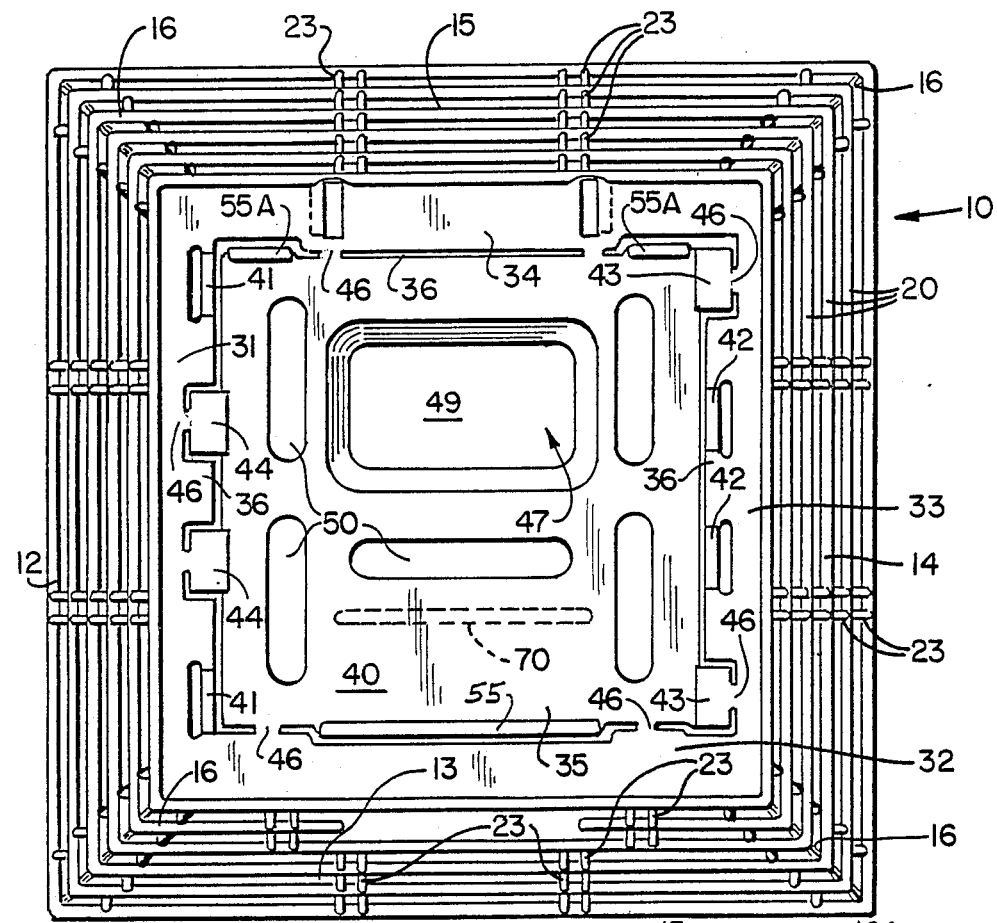
FIG. 1 is a top plan view of a bait box made according to the present invention shown in its initial molded configuration.

A plastic crab trap indicated generally at 10 comprises first, second, third and fourth side wall assemblies 12, 13, 14 and 15, respectively, that are joined at corner portions 16, and form a generally pyramidal-shaped housing.

Each of the side walls comprises a number of horizontal slats 20, which are held in vertically spaced relationship to form openings 21 that are slot-like openings to permit water to flow through the crab trap, and the slats are held together and reinforced with generally channel shaped bridging members 23. The channel shaped bridging members 23 have base walls 23C (see FIG. 3), and legs 23A which extend outwardly from the walls of the wall assemblies of the crab trap 10. The legs 23A of the channels 23 taper to blend in with the surface of the slat just above that channel as shown at 23D.

The upper side of the crab trap 10 has a top wall indicated generally at 30 which has perimeter wall sections 31, 32, 33 and 34. These perimeter wall sections join the respective wall assembly and define a central opening 35. The opening 35 is defined by four side edges that define the opening perimeter 36.

The crab trap 10 is initially molded in one operation, including all of the walls 12-15, and a cover member indicated at 40 is integrally molded in the opening 35 at the same time.

In an initial stage of manufacturing, as shown in FIG. 1, the cover member 40 is molded in place. The top wall section 31 is provided with molded-in cross bars or rods 41,41 at its inner edge and the wall section 33 has cross rods or bars 42,42 also molded at its inner edge. It can be seen that the cross bars are on directly opposite sides of opening 35. The sets of rods 41 ad 42 are not symmetrical on the opposite wall sections 31 and 33, but are laterally offset from the other set. The rods 41 are near the sides of the wall 31 and the rods 42 are close to the center of the wall 33.

The cover member 40 in turn has snap on bushings 43 formed on one side thereof, and are, in the initial molding operation on the same side as the rods 42, but spaced therefrom, and the cover member 40 has bushings 44,44 on the opposite edge thereof and these bushings 44 are offset from the bushings 43 and do not align therewith. The bushings 43 and 44 are C-shaped, snap-in bushings that have downwardly facing openings. As can be seen in FIG. 1, the bushings 43 are in alignment with the support rods 41 on the opposite wall section 31, in that when initially molded, the bushings 43 are formed adjacent to the wall section 33, and the bushings 44 in turn are formed adjacent the wall section 31 where the support rods 41 are formed. The bushings are molded in recesses formed in the peripheral edge of opening 35. It can thus be seen that the bushings 44 are transversely aligned with the rods 42 formed in wall section 33, and the bushings 43 are transversely aligned with the rods 41 that are formed at the inner edge of the top wall section 31.

Suitable gates or sprues are provided for providing plastic material flow between the cover (the main plastic material injection gate is in the center of the cover in FIG. 1) and the top wall sections and thus to the side walls. The cover 40 is supported in place in the opening 35 when the entire crab trap assembly is molded. When the molded part is removed from the mold, the cover will be as shown in FIG. 1. By cutting off the connector sprues or gates, indicated at 46, the cover 40 can be removed from its molded portion.

Figure 3:
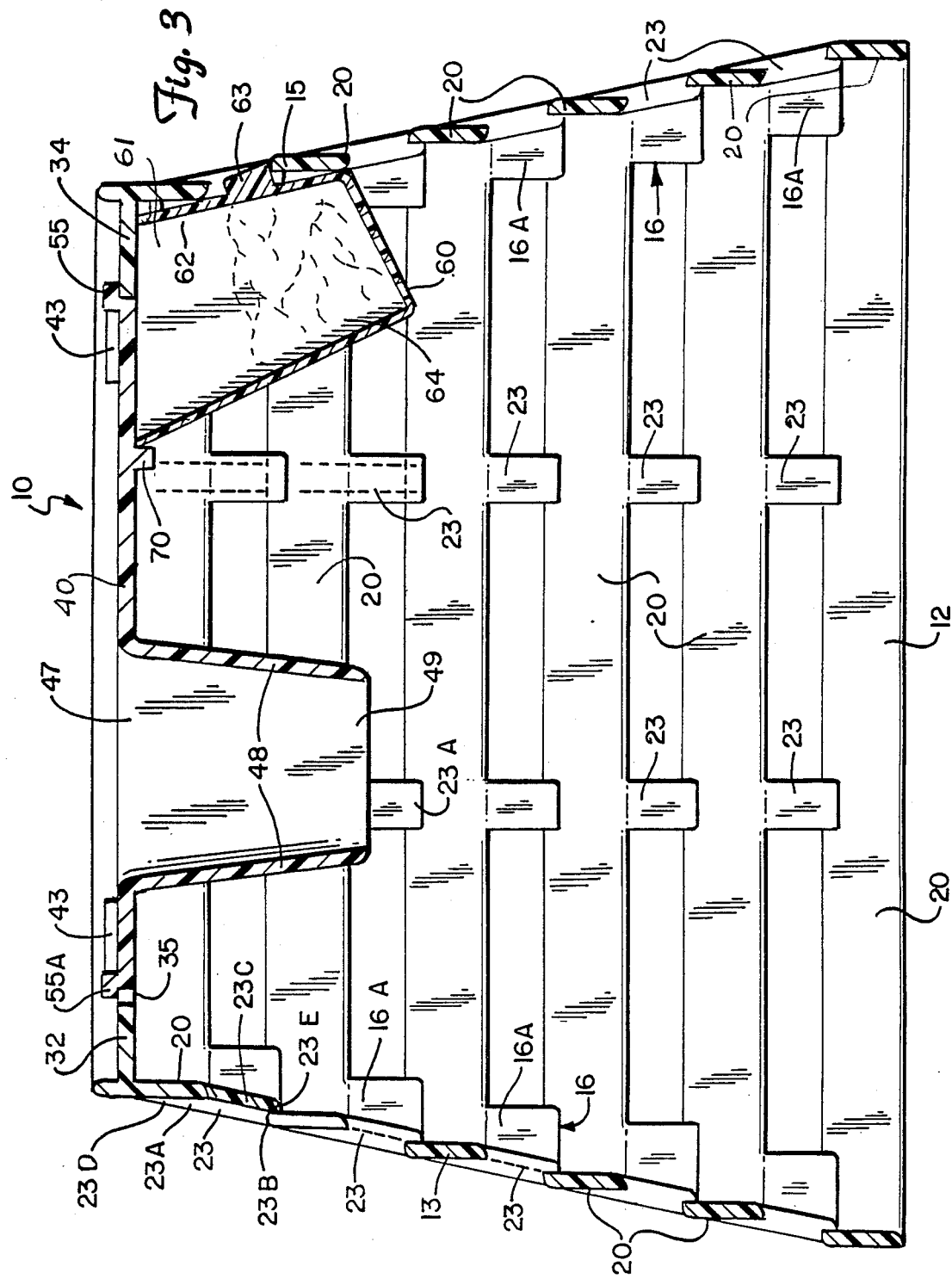
FIG. 3 is a sectional view taken as on line 3—3 in FIG. 2.

It should be noted that the cover 40 has an inlet opening or trap opening 47 that is defined by gently inwardly tapering walls 48 forming an inverse pyramid which has an open bottom 49. The opening 49 at the bottom of the inlet is spaced below the cover 40 as can be seen in FIG. 3. Additional slots 50 can be provided along the sides of the cover for water movement, but the crab or other crustacean that is to be trapped will move along the top wall and enter in through the opening 47 and drop through the lower opening 49 into the trap.

Figure 6:
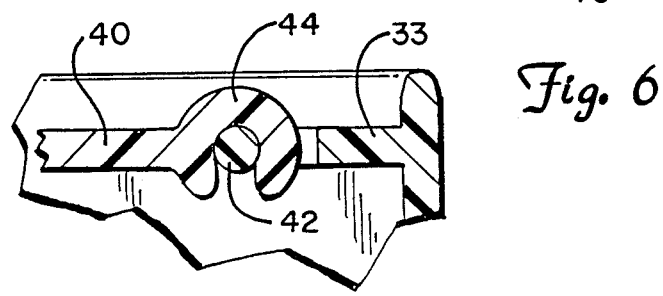
FIG. 6 is a fragmentary sectional view taken as on line 6—6 in FIG. 2.

When the cover 40 is removed from its molded position and rotated 180°, the bushings 44 will snap over the rods 42. The bushings 44 and rods 42 can be considered a latch arrangement. The bushings 43 will snap over the rods 41, and will form hinges. As shown in FIG. 6, the bushings 43 and 44 are made to receive the respective plastic rods and when the bushings 44 are released from rods 42, the bushings 43 will pivot on rods 41 so the cover 40 can be hinged open and closed.

Figure 2:
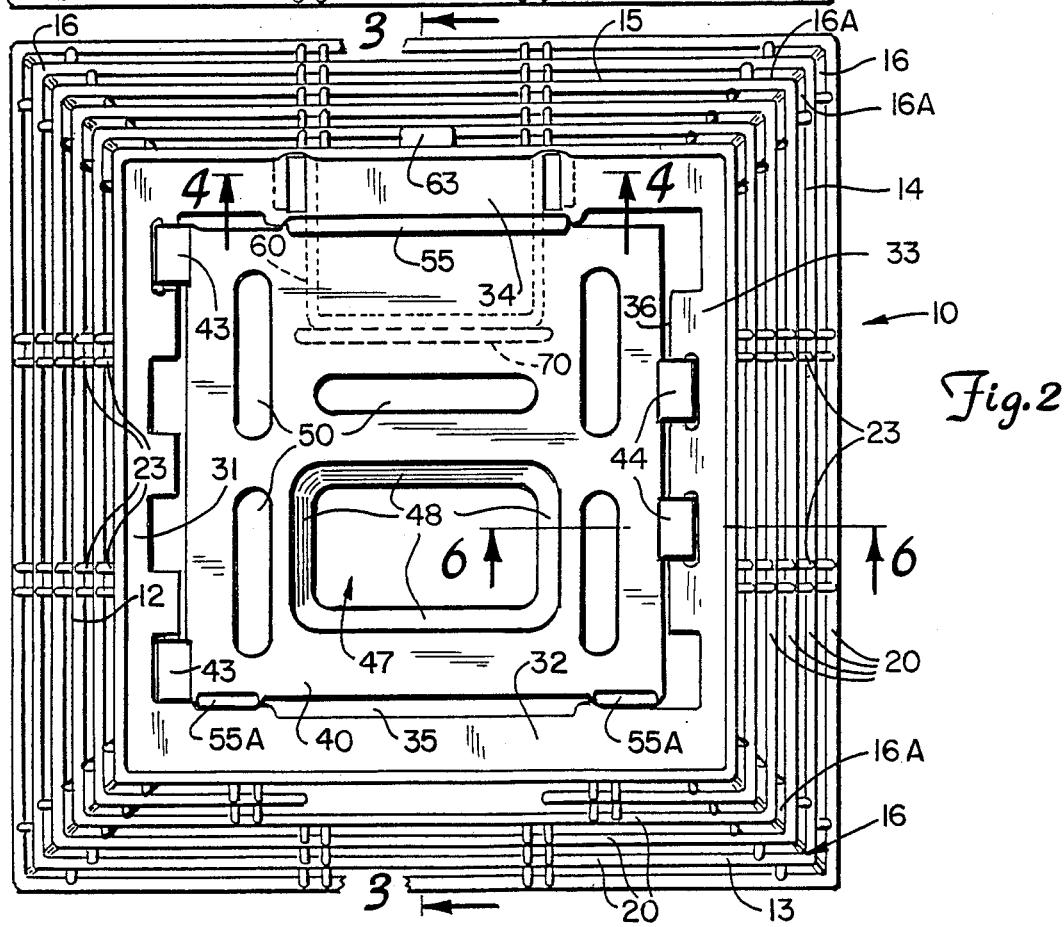
FIG. 2 is a top plan view of the bait box of FIG. 1 after the cover has been cut loose, and has been reversed and mounted for hinging and locking action for use.

The cover 40 further includes a stop ledge or member 55 that is adjacent one of the edges of the cover and spaced stop ledges 55A on the opposite edge of the cover to rest on the top wall 34 and prevent the cover 40 from being forced through the opening 35 as shown in FIGS. 2 and 3. The ledges 55 and 55A are formed in recesses in opening 35 when the trap is molded.

A bait box indicated generally at 60, as shown, is a molded box having a chamber 61 in which bait can be placed. The bait box 60 has a tapered wall 62 that is at an angle conforming to the side walls of the crab trap. The wall 62 has a lug 63 which fits between adjacent slats 20 of wall 15 and rests on the top edge of one slat to support that side of the bait box in position adjacent the wall 15.

Figure 4:
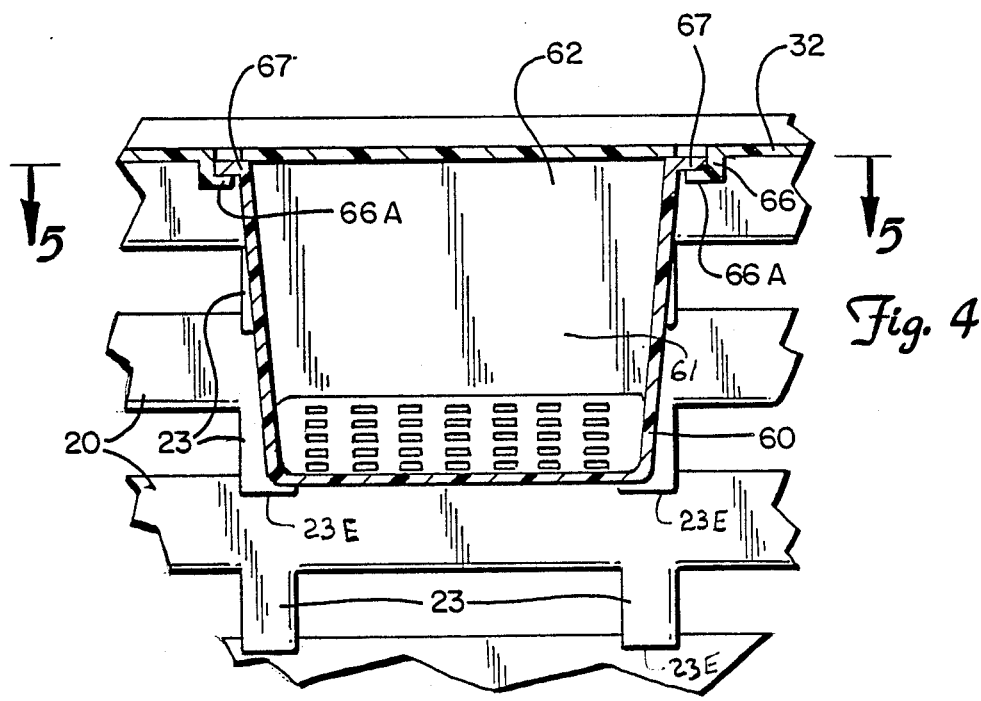
FIG. 4 is a sectional view taken as on line 4—4 in FIG. 2.
Figure 5:
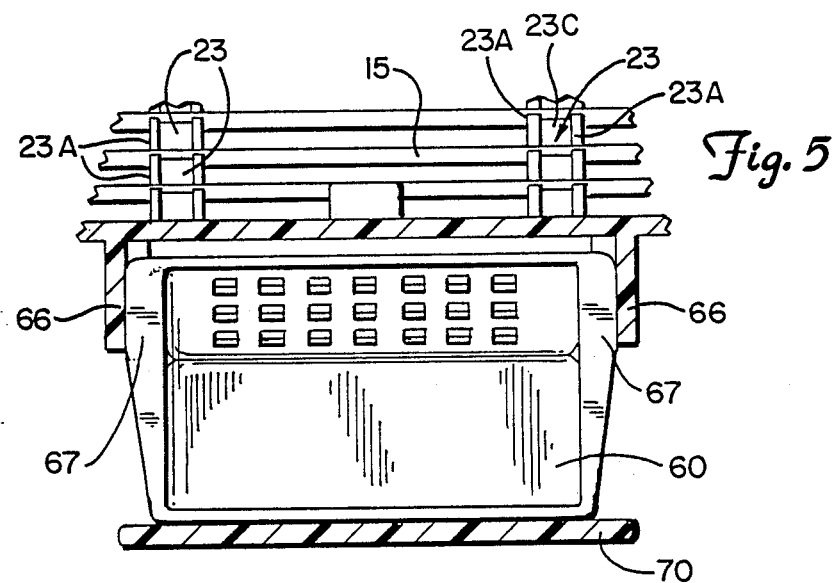
FIG. 5 is a sectional view taken as on line 5—5 and FIG. 4.

The top wall section 32 (which is one of the sides that does not have the hinges or latches), has a pair of L-shaped guide tracks 66 thereon that are spaced apart and form support lips 66A (see FIG. 4) on which guide lugs or ribs 67 molded on the sides of the bait box will slide. The bait box can thus be slid into the tracks 66 and held supported in position after being filled with bait. It can be seen that the bait box protrudes into the top opening 35 defined by the perimeter 36 on the interior edges of the top walls of the crab trap, and can be inserted and removed through opening 35. The cover member 40 has a stop lug 70 (FIG. 3) that depends from the cover and aligns with a wall of the bait box to hold the bait box against wall 15 when the cover 40 is closed, so that the lug 63 remains in position to be supported and the bait box is latched in place when the cover 40 is closed and latched.

Once the bait box is in place, and the cover latch closed using the snap-on bushing 44 snapping over the rods 42, the trap can be placed in its desired location for trapping crustaceans. The cover 40 can easily be opened, and the wide spacing of the bushings 43 on their pivot rods 41 provide stability to the cover when it is raised and lowered again. As can be seen in FIG. 3, where the uppermost channel-shaped support or bridging member 23 has been broken away, the channel-shaped members side legs 23A are supported at their lower ends on the top of the next lower slat 20, as shown at 23B. The base walls 23C actually provide a direct vertical support between the two adjacent slats 20 to provide good rigidity. Additionally, the side walls 23A taper against the next upper slat 20 as shown at 23D to blend in with this slat and permit easy molding.

Thus, there is good vertical support between the slats, and no sharp corners or edges. Also, the lower end of the base walls 23C blend into the adjacent lower slat 20 as shown with a rounded corner 23E in FIGS. 3 and 4.

Also as shown in FIG. 3, the corner portions 16 are comprised of vertical, solid short wall sections 16A, that extend between the slats 20 and form direct and secure support at the corners of the trap 10.

The wall portions 16A can have ribs at their outer edges for increased rigidity, as well.

In FIGS. 7-9, a modified form of the invention is shown wherein a sliding bottom panel or member can be placed into the trap. The variation shown in FIGS. 7-9 is adaptable particularly for lobster traps, to ensure that the trap will not be moved across the bottom and tipped easily once a crustacean such as a lobster is trapped. The size of the trap can be varied, of course, to accomodate lobsters, and the trap entrance openings can be changed as desired. The spacing between slats also can be changed, if desired.

In a simplified exemplary form, the sidewalls of the trap will be molded as before, but the lower or bottom slat will be modified to provide tracks for slidably guiding the bottom panel into position. In this form of the invention, the trap indicated at 75 has slats 76 defining a perimeter as previously explained. The slats are spaced apart and held in position with upright bridging members 77 that extend between the slats 76 in the same manner as the bridging members 23.

The crab trap includes lower side slats 80A and 80B, respectively. The lower side slats 80A and 80B are parallel and are provided with integrally molded, longitudinally extending ribs 82 on the outer surfaces. The ribs 82 are of size to be slidably received in grooves 83 defined in a pair of upright edge walls 84 of a bottom assembly 85. The trap bottom assembly 85 includes a bottom panel 86, which may be slatted and/or have a plurality of openings in the center portions thereof if desired, in order to provide for draining and for permitting sand or other foreign materials that may have gotten into the trap to flow out when the trap was lifted. However, the bottom panel prevents crustaceans from moving the trap along the bottom of the body of water in which it is placed and prevents, as can be done when there is no bottom panel, the crustaceans from lifting up the edges of the trap when the crustaceans are on the bottom of the body of water.

The bottom panel is held securely against vertical movement (movement away from the main portion of the trap) by the beads 82 that form tracks that cooperate with the grooves 83 and hold the bottom assembly securely in place.

Additionally, the bottom panel has vertical divider and guide walls 90 in the center portions thereof. As shown, there are two of these divider walls 90 that are spaced apart, and which fit between guide legs on the lower slats on the end of the trap. The lower end slats are indicated at 91,91 on opposite sides of the guide walls 90,90. The slats 91,91 have end edges that are spaced apart to receive the guide walls 90,90 therebetween. The guide walls 90,90 guide the bottom assembly when it is slid into place, and divide the bottom panel 86 into compartments.

The bottom panel 86 as shown has an upright latch wall 93 adjacent the edge thereof shown in FIG. 8, and this latch wall 93 is joined to the guide walls 90,90 so that it is securely supported, not only on the panel 86 but also on the ends of the walls 90,90. The upright latch wall 93 has C-shaped latch members 94,94 at opposite ends thereof which engage with latch beads 95,95 that are integral with the inner ends of the respective bottom end slat 91,91 on this end of the trap. The latch members 94,94 are generally C-shaped so that they will snap over the beads 95,95 and be held in place until a sufficient force tending to pull the bottom panel 86 outwardly is provided, and then the latch members 94,94 will spring open to slip over the beads 95,95. The wall 93 and the latch members 94,94 are made of suitable plastic that has resilience and can be formed to permit the snap action.

It can be seen that the latch members 94,94 can be integrally molded with the bottom panel. Additionally, stop ribs 98 (see FIG. 8, which shows them in top view) can be provided on the bottom panel 86, to provide proper positioning of the bottom panel. The stop members 98,98 stabilize the bottom panel 86 in its closed position, and tend to hold the slats 91,91 from being bulged outwardly by forces in the inside of the trap.

The bottom panel can easily be opened (and completely removed) by pulling it outwardly so that the walls 84,84 slide along the beads 82,82 that form guide tracks. Bait can be placed on the bottom panel, if desired, and the configuration of the slats and walls can be changed to suit different types of aquatic life to be trapped. For example, the bait cup may be eliminated or repositioned, larger entrance openings can be used in the cover, and individual features can be modified in this manner.

However, even with the bottom panel as shown in FIGS. 7-9, the cover panel that is molded in place, cut loose, and then reversed for assembly is still used.

It can be seen that the tapering of the walls of the plastic trap, and the blending in of the various wall components such as the side legs 23A as shown at 23D of the support channels 23, permits the trap to be pulled out of a mold, after being molded from the top. Again, cutting the gates or sprues 46 to release the cover 40, and then rotating the cover 180° permits the cover to be molded at the same time as the rest of the crab trap. Interfitting of the bushings or hubs 43 and 44 and molded in rods provide hinges and latches as previously explained.

Although the present invention has been described with reference to preferred embodiments, workers skilled in the art will recognize that changes may be made in form and detail without departing from the spirit and scope of the invention.

What is claimed is:

1. A molded crustacean trap assembly having a plurality of side walls forming a compartment, said side walls comprising spaced slats supporting a top wall, said top wall being attached to said side walls and having an edge portion defining a perimeter around a substantial size opening defined in the top wall;
   a cover member of size to sufficiently enclose said opening to prevent crustaceans from escaping through the opening in said top wall;
   support rod means for supporting a cover member on opposite sides of the perimeter of the top wall opening, said perimeter also having recesses defined inwardly from the edge of the opening on opposite sides of the opening from the support rod means, the support rod means and recesses on opposite sides of the opening being complimentally positioned so that the recesses on one side align with the support rod means on the other side;
   said cover member having an outer edge configured to fit within said top wall opening and having operable pivot bushings on opposite sides thereof aligning with the respective support rod means, and engagable with the support rod means to permit the pivot bushings on the cover to be snapped onto the support rod means and to pivot on an axis on one side of the opening between opened positions upon release of the pivot bushings on one side of the cover member; and said cover member having said bushings on each side fitting into the recesses of a corresponding opposite side during molding with the cover positioned 180° from its pivoting position, so that the cover member can be molded in place in the top wall opening with the pivot bushings being formed in place in the recesses of the perimeter, and upon release of the cover member from its molded position and rotating it 180°, the pivot bushings will engage the respective support rod means on opposite sides of the opening.

2. The crustacean trap of claim 1 wherein said cover member includes an entrance chute having walls defining an open bottom spaced downwardly from the cover and leading to the interior of said trap for permitting crustaceans to enter into said trap but to prevent them from easily escaping from the trap.

3. The crustacean trap of claim 1 including a bait box, slide means to support said bait box on said top wall adjacent an edge of said opening, other than the first two mentioned edges having the support rod means and recesses, said slide means to support providing guides to prevent sliding said bait box from the top wall opening toward one of the side walls of the crustacean trap and to be supported on said slide means, said bait box including a portion that protrudes into said opening, and a stop member on said cover that aligns with said bait box and prevents it from sliding into said opening more than a desired position when the cover member is in a closed position.

4. The crustacean trap of claim 1 and a bottom wall, means to removably mount the bottom wall to lower edges of the side wall to enclose the bottom of the trap and prevent removal of the bottom wall.

5. The crustacean trap of claim 4 wherein said means to removably mount the bottom wall comprises track guide means along opposite side walls of the trap including cooperation members on the bottom wall to slidably guide the bottom wall between open and closed positions.

6. The crustacean trap of claim 5, and latch means between one side wall and the bottom wall to releasably latch the bottom wall in closed position.

7. An all plastic, molded crustacean trap, comprising a plurality of side walls arranged to taper toward each other from a bottom to a top in generally pyramidal form, and having a top wall defining a perimeter edge adjacent said side walls, said top wall perimeter edge defining an opening, said trap being molded with spaced apart generally horizontally extending slats forming said side walls, and channel shaped members vertically extending between and integrally molded with said slats to hold said slats in spaced apart condition, said channel shaped member extending upwardly along the side walls and having side legs that extend outwardly from the side walls, said slats and said channels being molded in one operation and forming a rigid open bottom molded trap.

8. The plastic trap of claim 7 wherein said channel members have legs that extend outwardly from the side walls.

9. The plastic trap of claim 7 and a cover for the opening hingedly connected for movement between an open and a closed position, and a plastic bait box having a side tapered to conform to the taper of one of the side walls, plastic slide means on the edge portion of the top wall between one side wall and said opening for permitting said bait box to be slid into and out of a supported position through said opening, and means on said cover member to retain said bait box in a fixed position when the cover member is closed.

10. The plastic trap of claim 7 and a plastic bottom wall, means forming slidable tracks for permitting the bottom wall to be slidably moved from an open to a closed position.

11. The plastic trap of claim 10 and co-operating latch means between one side wall and the bottom wall for releasably latching the bottom wall in its closed position.

12. The plastic trap of claim 11 wherein said slidable tracks comprise bead members adjacent the lower edge of a pair of side walls and wall means extending from the bottom wall on opposite sides thereof, said wall means having means for slidably engaging the bead members.

13. The all plastic molded crustacean trap of claim 7 wherein said walls meet at corners, and the slats forming each of the walls being supported relative to the next adjacent slats in vertical directions at the corners by support members extending between the slats and wherein there is at least one additional support member between adjacent slats at location between the corners.

14. An all plastic, molded crustacean trap, comprising a plurality of side walls arranged in generally pyramidal form to define an interior and having a top wall defining a perimeter edge adjacent said side walls, said top wall perimeter edge defining an opening, said trap being molded with spaced apart generally horizontally extending slats forming said side walls, and support members vertically extending between and integrally molded with said slats to hold said slats in spaced apart relationship, said support members extending upwardly along the side walls, said slats and said support members being molded in one operation, said opening in said top wall being of size to provide access to the interior of the trap, and a cover member for closing said opening, said cover member being originally molded integrally with said side walls and said top wall, and being detachable after molding, said cover member and the perimeter of said opening defined by the top perimeter edge having complemental perimeter portions, which upon rotation of the cover member from a molding position engage and form hinge means for hinging said cover member between a closed position and an open position.

* * * * *